2,820,473

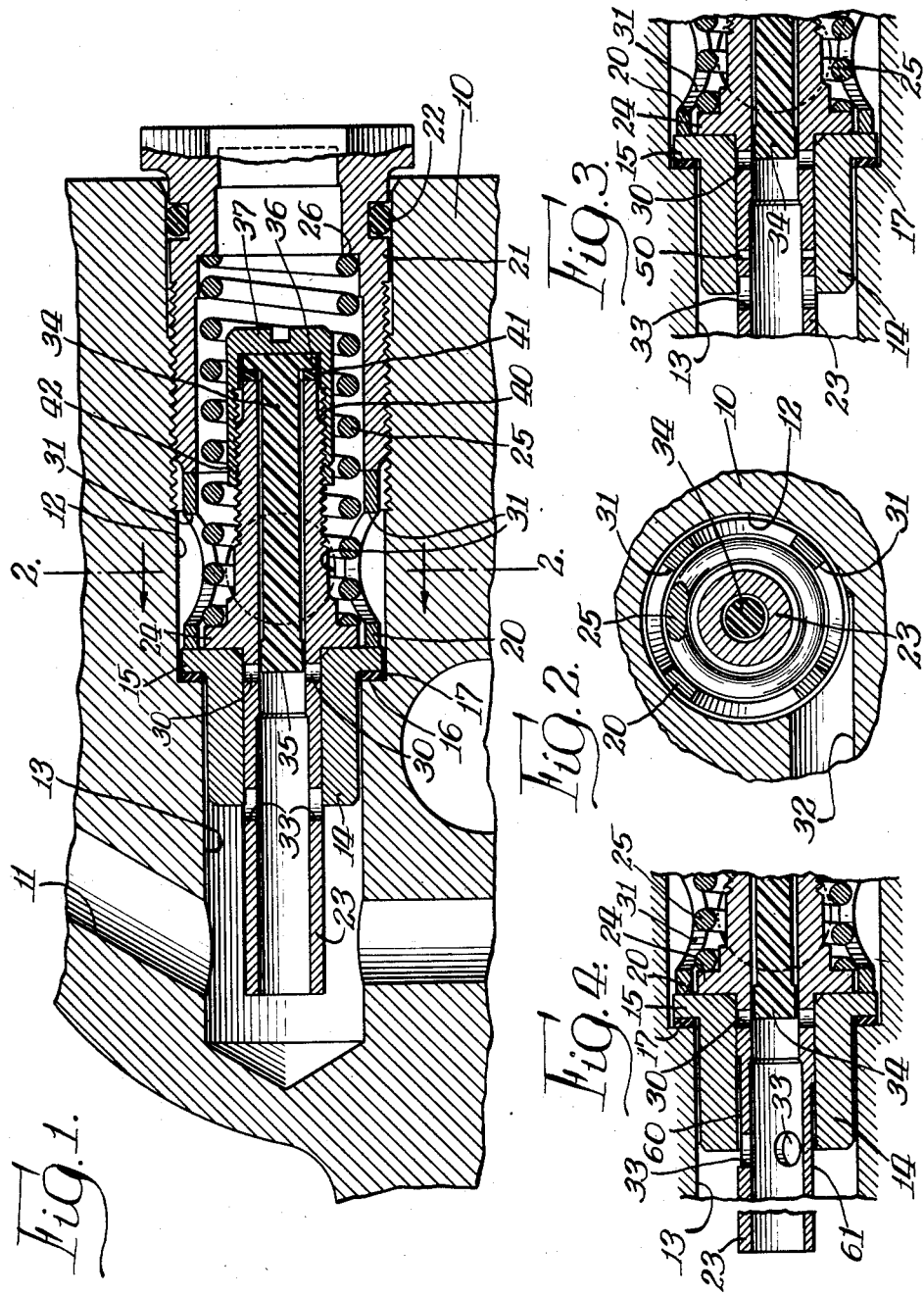

TEMPERATURE VARIABLE PRESSURE REGULATOR

Neville M. Reiners, Columbus, Ind., assignor to Cummins Engine Company, Inc., Columbus, Ind., a corporation of Indiana Application October 13, 1953, Serial No. 385,840

12 Claims. (Cl. 137—468)

The invention relates generally to pressure regulators and more particularly to a pressure regulator for the fuel supply apparatus of an internal combustion engine.

The general object of the invention is to provide a novel pressure regulator for by-passing fuel from a fuel supply line at a rate varying with the pressure of the fuel in the line.

Another object is to provide a novel pressure regulator of the foregoing character, by which the rate of by-passing the fuel is materially increased at a predetermined pressure in the supply line.

A further object is to provide a pressure regulator having novel means for adjusting the rate at which the fuel is by-passed.

Still another object is to provide a pressure regulator of the foregoing character, which compensates for variations in viscosity of the fuel due to differences in temperature.

Other objects and advantages will become apparent from the following description taken in connection with the accompanying drawing, in which:

Fig. 1 is a longitudinal sectional view of the pressure regulator embodying the features of the invention.

Fig. 2 is a transverse sectional view taken on the line 2—2 of Fig. 1.

Fig. 3 is a fragmentary view similar to a portion of Fig. 1 and showing a modified form; and Fig. 4 is a fragmentary view similar to Fig. 3 and showing another modified form.

The pressure regulator disclosed herein is adapted to be used in a fuel supply apparatus of the character shown in my co-pending application Serial No. 338,646, filed February 25, 1953 which issued on December 20, 1955 as Patent No. 2,727,498. As disclosed in said patent, fuel is adapted to be drawn from a source of supply, such as a fuel tank, by a pump, preferably of the gear type, which delivers the fuel through a fuel line comprising suitable passages in a housing to a hand throttle and a governor-operated valve. From the governor-operated valve, the fuel is carried by a common supply rail to a plurality of injectors, one for each cylinder. The metering of the fuel to the cylinders is accomplished by means of a metering orifice in each injector, which is opened and closed by a reciprocating plunger in the injector, thereby determing the period of time that the metering orifice is open. This period of time, in conjunction with the pressure differential in the fuel across such orifice determines the quantity of fuel supplied to each cylinder. The pressure in the fuel supplied by the pump is thus a determining factor and such pressure is regulated by means of a pressure regulator disposed in the delivery passage from the pump and adapted to by-pass a portion of the fuel delivered by the pump so as to determine the pressure in the fuel throughout the speed range of the engine, thereby controlling the pressure in the fuel supplied to the injectors to produce a predetermined torque curve.

Fig. 1 of the drawing shows a housing 10 comprising a portion of the fuel supply apparatus generally described above and the passage through which the pump delivers the fuel is shown at 11. The housing 10 is also provided with an internal bore comprising an enlarged portion 12 and a portion of smaller internal diameter 13 extending from the passage 11 to receive a pressure regulator embodying the features of the invention.

The pressure regulator is adapted to be mounted in the bore formed by the portion 12 and 13 and comprises a tubular body member having slidably and telescopically mounted therein a regulating member also of tubular form. The regulating member is open at one end to receive fuel from the passage 11 and is closed at its other end so that the pressure of the fuel will tend to move the regulating member within the body member, with a spring opposing the movement of the regulating member. One of said members, in this instance the regulating member, is provided with at least one radial opening which, when there is no pressure to move the regulating member, is closed by the other member, in this instance by being located within the body member. However, when the regulating member is moved sufficiently by the pressure of the fuel, the radial opening will be uncovered and thus permit the flow of fuel therethrough. Such by-passed fuel is discharged through the pressure regulator for return to the intake side of the pump. The flow of fuel through the radial opening of course varies with the pressure of the fuel applied thereto so that the quantity of fuel by-passed by the regulator will vary with the pressure in the passage 11.

The regulating member is also provided with an additional radial opening of larger size than the first-mentioned opening and arranged to be moved beyond the end of the body member to by-pass fuel when the pressure of the fuel acting on the regulating member reaches a predetermined maximum. The second radial opening is of sufficient size, when acting in conjunction with the first-mentioned radial opening, to prevent the fuel in the passage 11 from exceeding such predetermined maximum pressure. Normally the second radial opening is closed and the first-mentioned radial opening serves to regulate the pressure of the fuel supplied to the injectors. However, should the flow of fuel be shut off by the governor-operated valve when the engine is running at a maximum speed, the pump will tend to build up pressure within the passage 11 and thus shift the regulating member to a point where the second radial opening is opened.

The pressure regulator shown herein also includes means for adjusting the effective size of the first-mentioned radial opening so that proper by-passing of fuel occurs to give the desired variation in pressure for any given installation. Such means is in the form of a plug closing the end of the regulating member and extending adjacent the first-mentioned radial opening. The plug is adjustable longitudinally of the regulating member to vary the effective size of the radial opening.

The pressure regulator is also arranged to compensate for variation in the viscosity of the fuel, since pressures will tend to be higher when the fuel is more viscous as when the engine is first started. To this end, the plug is made of a material which has a greater coefficient of expansion than the metal of the regulating member. The plug thus will expand to a greater extent than the regulating member as the fuel heats up through operation of the engine or through other causes, and will reduce the effective size of the radial opening, thereby compensating for the greater fluidity of the fuel under the higher temperature.

As shown in the drawing, the body member, indicated at 14, is cylindrical in form and is provided at one end with a flange 15 adapted to be seated against the shoulder 16 formed at the point where the enlarged portion 12 meets the smaller portion 13 of the bore in which the pressure regulator is mounted. A gasket 17 is preferably interposed between the flange 15 and the shoulder 16. The body member 14 is held in place by a sleeve 20 abutting the flange 15 and held in the enlarged portion 12 of the bore by a cup-shaped member 21 closing the outer end of the enlarged portion 12 of the bore. An O-ring 22 is positioned adjacent the outer end of the cup-shaped member 21 to provide a seal at that point.

Slidably mounted with the body member 14 is a regulating member 23 which is in the form of an elongated tube. The regulating member 23 extends beyond both ends of the body member 14 and intermediate its ends is provided with a flange 24 adapted to seat against the flange 15 on the body member when the fuel in the passage 11 is not under pressure. The regulating member 23 is open at the end adjacent the passage 11 to permit fuel under pressure to enter the regulating member, but is closed at its other end so that the pressure of the fuel will tend to move it longitudinally. Resisting movement of the regulating member 23 is a coil spring 25 seated at one end against the flange 24 of the regulating member and at its other end against a shoulder 26 formed adjacent the outer end of the cup-shaped member 21. Thus movement of the regulating member 23 will vary with the pressure of the fuel discharged by the pump through the passage 11.

To by-pass fuel when the pressure thereof moves the regulating member, the latter is provided with one or more radial openings 30, two being shown. Such opening 30 lies within the body member 14 and is closed thereby when there is no pressure in the passage 11. However, when the pressure in the fuel is increased sufficiently to move the regulating member so that the radial opening 30 is beyond the right-hand end of the body member 14, as shown in the drawing, fuel will flow through the radial opening 30 and the rate of flow therethrough will depend upon the pressure of the fuel. While only one radial opening 30 may be sufficient, depending upon its size, preferably two or more such openings are provided so that each opening may be of relatively small size.

When the by-passed fuel flows through the radial opening 30, it passes outwardly over the flange 15 on the body member 14 and thence longitudinally between the flange 24 on the regulating member and the sleeve 20, sufficient annular space being provided between these two members to permit the fuel to flow freely. The sleeve 20 is provided with a plurality of radial openings 31, one or more of which communicate with a passage 32 (see Fig. 2) formed in the housing 10. The passage 32 discharges the by-passed fuel at any point where it may mingle with the fuel being drawn into the pump. Preferably the passage 32 connects directly with the intake of the pump as shown in my co-pending application heretofore referred to.

With the foregoing arrangement, a portion of the fuel delivered by the pump through the passage 11 will be by-passed through the radial openings 30, with the rate at which the fuel is by-passed depending upon the pressure therein. The by-passing of the fuel in this manner regulates the pressure of the fuel supplied by the pump to the injectors.

The present pressure regulator is also arranged to by-pass the entire flow of fuel delivered by the pump when necessary. In the fuel supply apparatus shown in my patent, such rate of by-passing becomes necessary when the flow of fuel to the injectors is cut off by the governor-operated valve, should the speed of the engine tend to exceed a predetermined maximum, or is cut-off by the shut-down valve or hand throttle. To provide for by-passing the entire output of the pump, the regulating member 23 is provided with one or more additional radial openings 33, two in the present instance, which are longitudinally spaced from the radial openings 30 and which are of sufficient size, when operating in conjunction with the openings 30, to by-pass the entire output of the pump running at the maximum desired speed for the engine. When flow of fuel to the injectors is prevented by the governor-operated valve, the fuel delivered by the pump builds up the pressure in the passage 11 and causes further movement of the regulating member 23 to the right, as shown in the drawing, until both the openings 30 and the openings 33 are beyond the right-hand end of the body member 14. When this occurs, the fuel from the passage 11 flows through the regulating member and outwardly through both the openings 30 and the openings 33 for return to the intake side of the pump, and at the pressure existing at such time, the combined areas of the openings 30 and 33 are sufficient to accommodate the entire output of the pump.

The pressure regulator shown herein is constructed so that the by-passing of the fuel may be adjusted to suit the particular characteristics of the engine and fuel supply system with which it operates. To this end, the effective size of the radial openings 30 may be varied. For this purpose, a plug 34 is mounted in the right-hand end of the regulating member 23 so that it has an end surface 35 extending adjacent the openings 30. By adjusting the plug 34 longitudinally of the regulating member 23, the end surface 35 of the plug will cover more or less the openings 30 so as to vary the effective size thereof. At its extreme right-hand end, the plug 34 is provided with a head 36 engaged by a cap 37 threaded, as at 40, on the end of the regulating member 23. Interposed between the head 36 of the plug 34 and the end of the regulating member 23 are one or more shims or a laminated washer 41. The position of the cap 37 and hence the adjustment of the plug 34 relative to the radial openings 30 is determined when the engine and fuel supply apparatus with the pressure regulator is first tested at the factory. At that time the proper thickness of the laminated washer 41 is determined to provide the desired effective size of the radial openings 30 and the cap 37, when screwed tight to clamp the parts in place, is then fastened to the regulating member in a manner to avoid disturbing such adjustment. To this end, a lock nut (not shown) may be used or the skirt of the cap may be punched into the threads on the regulating member, as at the point 42, to hold the cap in fixed adjusted position.

The invention also includes means for compensating for differences in the viscosity of the fuel due to changes in temperature thereof. When the fuel is cold, it of course has much greater viscosity and the flow through orifices will be less. To compensate for such variation in viscosity, the pressure regulator is arranged to vary the effective size of the radial openings 30 with variations in the temperature of the fuel. To this end, the plug 34 is made of a material which has a greater coefficient of expansion than the material of which the regulating member 23 is made. Thus as the fuel heats up and its temperature is imparted to the plug 34 and the regulating member 23, the plug 34 will expand to a greater extent than the regulating member 23. The end 35 of the plug 34 will thereby reduce the effective size of the radial openings 30 as the fuel increases in temperature and becomes more fluid. The compensation of course is very slight but it has been found to be sufficient to yield the desired results. The actual relative expansion of the plug depends, of course, on its length as well as its coefficient of expansion. The regulating member 23 is made of metal and the plug 34 may be made of a different metal but preferably is made of a molded plastic of the type which is characterized by having a substantially greater coefficient of expansion than the metal of the regulating member 23 so that, for the length shown, the plug has the desired actual expansion. Thus the plug 34 may be made of the material known as Tenite or any other plastic having similar expansion characteristics.

With some engines, it may be desirable to increase the area of the by-pass openings with an increase in pressure in the fuel line in order to obtain a desired torque curve for the engine. A regulator having this feature is shown in Fig. 3 of the drawing wherein the regulating member 23, in addition to the first radial opening 30 and the dumping opening 33, has one or more auxiliary radial openings 50. While one such auxiliary opening 50 may be sufficient, two such openings as shown or more may be provided. The size of each opening 50 is determined by the effect on the torque curve it is desired to obtain but in most instances each opening 50 will be smaller than each opening 30. The opening 50 may be located anywhere between the openings 30 and the openings 33. However, the increased by-pass area, if needed, is usually placed so that the torque curve is affected thereby at speeds approaching the maximum engine speed. For this reason, the openings 50 are shown as being located adjacent the dumping opening 33.

The embodiment of the invention shown in Fig. 4 also provides for increase in the area for by-passing fuel with an increase in pressure in the fuel to obtain a desired torque curve for the engine. Thus, the regulator shown in Fig. 4, in addition to the first radial opening 30 and the dumping opening 33, has an auxiliary opening in the form of a passage on the exterior of the regulating member 23 extending from the dumping opening 33 toward the first opening 30 but terminating short of the first opening so that it is spaced therefrom. Such passage is provided by cutting a flat side 60 on the regulating member, extending from the opening 33 toward the right, as shown in Fig. 4, with the right-hand end of the flat side 60 spaced from the first opening 30.

In operation, a certain fuel pressure will shift the regulating member to the right to open the first opening 30 and by-pass fuel therethrough. With a higher fuel pressure, the regulating member will be moved farther to the right until the right-hand end portion of the passage formed by the flat side 60 extends beyond the end of the body member 14. In that position, fuel will flow radially into the dumping opening 33 and thence longitudinally along the flat side 60 for by-passing. At still higher pressure, the regulating member will be shifted sufficiently to move the dumping opening 33 beyond the end of the body member to accommodate the entire output of the pump as in the case of the other forms. When the regulating member is in this position, the entire flat side 60 is beyond the end of the body member and any dirt that may have collected thereon will be flushed off. The flat side 60 may be dimensioned to so modify the flow therethrough and through the first opening 30 that a desired torque curve for the engine is obtained.

An increase in area for by-passing fuel may also be provided by a passage formed by a flat side 61 on the exterior of the regulating member, extending from the left end of the regulating member toward the opening 30 but spaced longitudinally therefrom. In Fig. 4 I have shown the flat side 61 extending from the end of the regulating member in addition to the flat side 60 which extends only from the hole 33. It is to be understood, however, that either type of flat side may be used when only one is desired. When two flat sides are provided to give the desired by-passing area, they are preferably placed opposite each other to balance the pressure radially on the regulating member, and the right hand ends of the flat sides 60 and 61 are differently spaced from the holes 30, as shown in Fig. 4, so that the passages formed by the respective flat sides are opened at different pressures.

From the foregoing description, it will be evident that I have provided a novel pressure regulator for by-passing fuel from a fuel supply line at a rate varying with the pressure of the fuel in the line. The pressure regulator provides a means for by-passing the entire output of the pump supplying the fuel when the pressure in the fuel rises to a predetermined maximum. The regulator also provides means for adjusting the rate at which the fuel is by-passed so that the regulator functions properly for the fuel system with which it operates. The adjusting means further provides for compensation for variations in viscosity of the fuel due to differences in temperature. In the modified forms shown in Figs. 3 and 4, the openings 50 and the flat sides 60 and 61 provide for additional by-pass area to modify the torque curve of the engine.

I claim:

1. A pressure regulator for by-passing fuel from a fuel line, comprising a body member, a regulating member slidably mounted in said body member, one of said members having a radial opening adapted to be opened and closed by movement of said regulating member relative to said body member, spring means engaging said regulating member and tending to move said regulating member in a direction to close said radial opening, and a compensating element extending adjacent said radial opening and having a coefficient of expansion different from that of said one member to vary the effective size of said radial opening upon variation in the temperature of the fuel to compensate for the variation in the viscosity of the fuel.

2. A pressure regulator for by-passing fuel from a fuel line, comprising a pair of telescopically arranged relatively movable members, one of said members having a radial opening adapted to be opened and closed by the other member upon relative movement therebetween, spring means tending to effect relative movement in a direction to close said radial opening, and a compensating element associated with said radial opening and having a coefficient of expansion different from that of said one member to vary the effective size of said radial opening upon variation in the temperature of the fuel to compensate for the variation in the viscosity of the fuel.

3. A pressure regulator for by-passing fuel from a fuel line, comprising a tubular body member, a tubular regulating member slidably mounted in said body member and having a radial opening adapted to be closed when within said body member and to be open when beyond the end of said body member, spring means engaging said regulating member and tending to move said radial opening within said body member, and a plug mounted in said regulating member and extending adjacent said radial opening, said plug having a greater coefficient of expansion than said regulating member to vary the effective size of said radial opening upon variation in the temperature of the fuel to compensate for the variation in the viscosity of the fuel.

4. A pressure regulator for by-passing fuel from a fuel line, comprising a tubular body member, a tubular regulating member slidably mounted in said body member and having a radial opening intermediate its ends closed by body member when within the latter and open when beyond the end of the latter, spring means engaging said regulating member and tending to move it to shift said opening within said body member, a plug mounted in said regulating member with one end rigidly secured to said regulating member and its other extending adjacent said radial opening, said plug having a greater coefficient of expansion than said regulating member to vary the effective size of said radial opening upon variation in temperature of the fuel to compensate for the variation in the viscosity of the fuel.

5. A pressure regulator for by-passing fuel from a fuel line, comprising a tubular body member, a tubular regulating member slidably mounted in said body member and having a radial opening adapted to be opened and closed by movement of said regulating member to move said opening into and out of said body member, spring means tending to shift said regulating member to move said opening into said body member, and a plug mounted in said regulating member and extending adjacent said opening, said regulating member being made of metal and said plug being made of plastic material having a greater coefficient of expansion than the metal to vary the effective size of said opening upon variation in the temperature of the fuel to compensate for the variation in the viscosity of the fuel.

6. A pressure regulator for by-passing fuel from a fuel line, comprising a tubular body member, a tubular regulating member slidably mounted in said body member and having a radial opening adapted to be opened and closed by movement of said regulating member to move said opening into and out of said body member, spring means tending to shift said regulating member to move said opening into said body member, and a plug in said regulating member and extending adjacent said opening, said plug being adjustably mounted to adjust the effective size of said opening and also having a greater coefficient of expansion than said regulating member to vary the effective size of said opening in response to variation in the temperature of the fuel to compensate for the variation in the viscosity of the fuel.

7. A pressure regulator for by-passing fuel from a fuel line, comprising a tubular body member, a tubular regulating member slidably mounted in said body member, said regulating member being open at one end for admitting fuel from said line and being closed at its other end and having a first radial opening intermediate its ends and another radial opening of smaller size located between said first opening and the open end of said regulating member, spring means tending to shift said regulating member to a position where both of said openings lie within said body member and are closed thereby, the pressure of the fuel against said closed end of said regulating member tending to shift it to move said first opening beyond the end of said body member to permit flow of fuel through said first opening and with higher pressure to move said regulating member to a position where both of said openings are beyond the end of said body member to increase the flow of fuel through said regulating member, and means for varying the effective size of said first radial opening in response to variation in the temperature of the fuel to compensate for the variation in the viscosity of the fuel.

8. A pressure regulator for by-passing fuel from a fuel line, comprising a tubular body member, a tubular regulating member slidably mounted in said body member, said regulating member being open at one end for admitting fuel from said line and being closed at its other end and having a first radial opening intermediate its ends, an auxiliary radial opening located between said first opening and the open end of said regulating member, and a dumping opening located between said auxiliary opening and the open end of said regulating member, spring means tending to shift said regulating member to a position where all of said openings lie within said body member and are closed thereby, the pressure of the fuel against said closed end of said regulating member tending to shift it to move said first opening beyond the end of said body member, then the auxiliary opening and then the dumping opening with increasing pressures to successively increase the flow through said regulating member, and means for varying the effective size of said first radial opening in response to variation in the temperature of the fuel to compensate for the variation in the viscosity of the fuel.

9. A pressure regulator according to claim 3, in which said regulating member has a second radial opening spaced from the first-mentioned radial opening and a passage on its exterior extending from said second opening toward said first opening but having its end spaced therefrom, the pressure of the fuel tending to shift said regulating member to move said first opening beyond the said body member to permit flow of fuel through said first opening and with higher pressure to move said end of the passage beyond said body member to permit flow through said second opening and said passage.

10. A pressure regulator according to claim 3, in which said regulating member has a passage on its exterior open to receive fuel at one end and extending toward said opening with its other end spaced therefrom, the pressure of the fuel tending to shift said regulating member to move said opening beyond said body member to permit flow of fuel through said opening and with higher pressure to move said other end of said passage beyond said body member to permit flow through said passage.

11. A pressure regulator according to claim 10, in which said passage is provided by a flat side on the exterior of said regulating member.

12. A pressure regulator according to claim 3, in which said regulating member has a pair of passages on its exterior open to receive fuel at one end and extending toward said radial opening but having their other ends spaced different distances therefrom, the pressure of the fuel tending to shift said regulating member to move said opening beyond said body member to permit flow through said opening and with higher pressure to move said other end of one of said passages beyond said body member to permit flow through said one passage and with still higher pressure to move said other end of the other of said passages beyond the body member to permit flow through said other passage.

References Cited in the file of this patent

UNITED STATES PATENTS

| | | |
|---|---|---|
| 659,578 | Chadwick | Oct. 9, 1900 |
| 1,702,550 | Stevenson | Feb. 19, 1929 |
| 1,813,122 | Moore | July 7, 1931 |
| 2,021,337 | Trefz | Nov. 19, 1935 |

FOREIGN PATENTS

| | | |
|---|---|---|
| 278,451 | Great Britain | Oct. 10, 1927 |
| 545,845 | Great Britain | June 16, 1942 |
| 495,266 | Belgium | May 15, 1950 |